Feb. 28, 1967 P. L. JACHIM ETAL 3,307,067

DYNAMIC BLUE LATERAL CORRECTION SYSTEM

Filed April 16, 1964

INVENTORS
Paul L. Jachim
Robert B. Hansen
BY
Mueller & Aichele
Attys.

3,307,067
Patented Feb. 28, 1967

3,307,067

DYNAMIC BLUE LATERAL CORRECTION SYSTEM

Paul L. Jachim, Franklin Park, and Robert B. Hansen, Arlington Heights, Ill., assignors to Motorola, Inc., Chicago, Ill., a corporation of Illinois Filed Apr. 16, 1964, Ser. No. 360,240
7 Claims. (Cl. 315—27)

This invention relates to television receivers and more particularly to beam control apparatus useful with a cathode ray tube, such as a tri-beam color picture tube.

The Armstrong and O'Fallon Patent No. 2,880,366 sets forth the desirability of separate pre-convergence control of one beam in a tri-beam cathode ray tube. A problem often arises if the beam associated with the blue raster in a tri-beam picture tube does not experience the same yoke deflection field as do the beams associated with the red and green rasters. Or, despite separate dynamic and static convergence of the three beams, there may be conditions under which optimum registry of the red and green beams still falls short of desired registry for the blue beam.

In the above-identified patent a correction is proposed which utilizes a magnetic deflection field for the blue beam alone in its pre-convergence path. Sawtooth line deflection signals have been found to effectively vary the amount of horizontal sweep individually for the blue raster thus affording improved registry. However, it may be appreciated that such a correction must be manually adjustable throughout a continuous range as one views the cathode ray screen to note the effect of the adjustment. Adjustability of the described dynamic blue lateral corrector can be troublesome in other engineering respects, particularly since the corrector generally carries the horizontal deflection current which often exceeds one ampere in peak value.

An object of the present invention is to provide an adjustable beam corrector for a cathode ray tube which is smoothly and continuously adjustable throughout its range.

Another object is to provide a beam corrector which can be adjusted remotely from its functional position on the tube neck without conducting high direct current voltage to the remote control position.

Another object is to provide a dynamic blue lateral corrector having minimum affect on the horizontal sweep system of a television receiver.

In a specific form of the invention a magnetic beam corrector includes first and second inductively coupled windings positioned adjacent the pre-convergence path of the beam providing the blue raster. The first winding is connected in series with the deflection yoke to carry sawtooth deflection current. A variable impedance is connected across the second winding to form a control loop so that induced current flowing therein can be varied to control the net flux produced by the corrector. The variable impedance can be a slug tuned inductor remotely positioned from the tube neck and providing a substantial blue raster size change. The impedance may also include a variable resistor which may be used for reducing the control loop current at the maximum inductor setting for extending the available correction. Additionally the resistor may be varied at relatively high impedance values of the slug tuned inductor in order to introduce an asymmetrical correction for the blue raster.

In the drawing, FIG. 1 is a diagram, partly in block and partly schematic, representing a color television receiver incorporating the invention;

Figures 1, 2, 4:
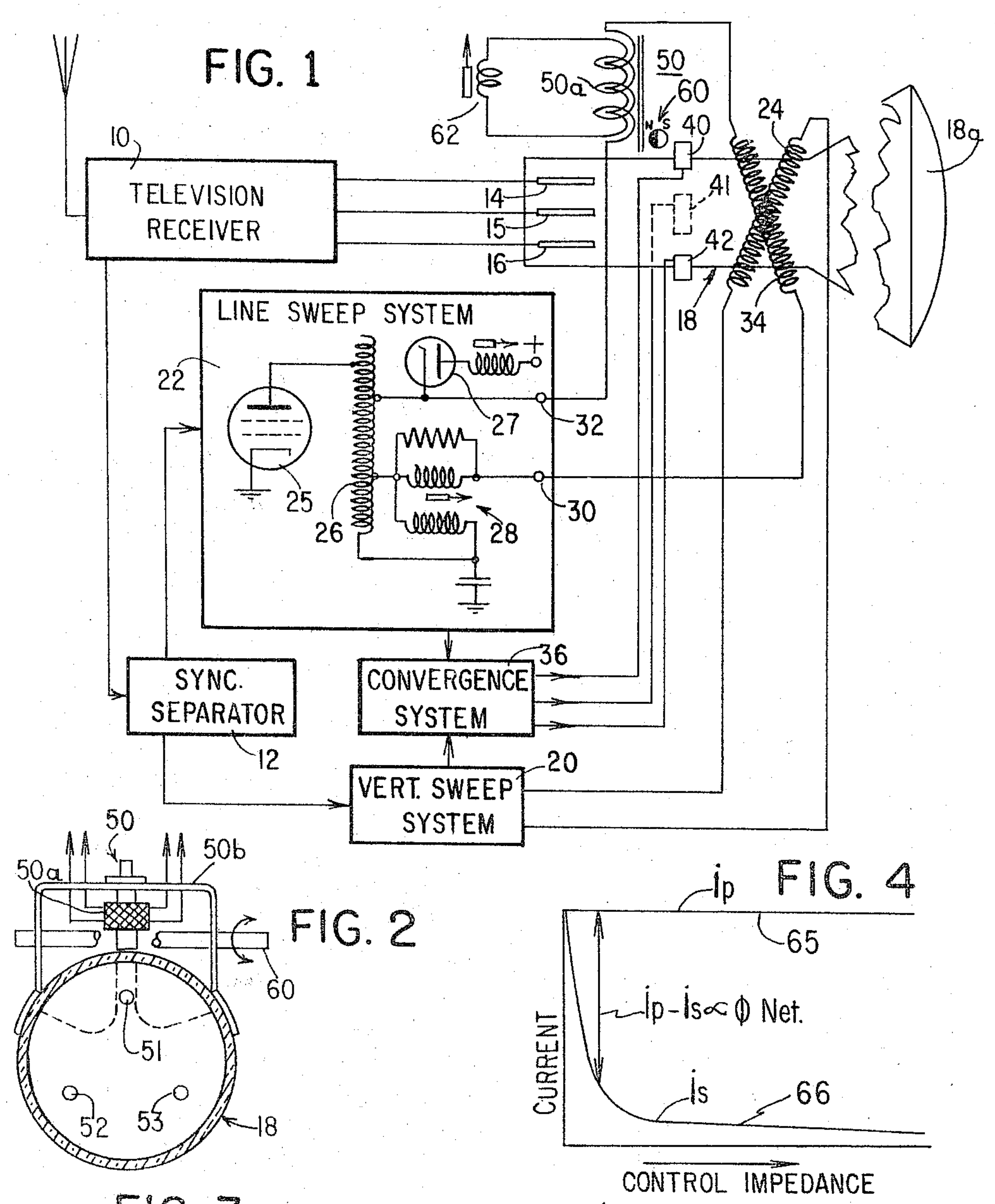
FIG. 2 is a sectional diagram showing the neck of a tri-beam cathode ray tube and the placement of the dynamic blue lateral corrector.
FIG. 4 is a graph useful in explaining the operation of the invention.

In FIG. 1 the color television receiver 10 incorporates known circuitry to select, amplify and demodulate a color television signal to provide reproduced sound through a loundspeaker (not shown), signals for the synchronizing signal separator 12, and video signal components for the electron guns 14, 15 and 16 in the tri-beam cathode ray tube 18. The electron guns 14–16 are associated with respective electron beams which produce red, green and blue rasters on the screen 18*a* of the picture tube. The synchronizing signal separator circuit 12 segregates the vertical and line synchronizing pulses in the composite television signal and these are then respectively applied to the vertical sweep system 20 and the horizontal or line sweep system 22. The vertical sweep system 20 produces a sawtooth deflection current at 60 cycles per second which is applied to the vertical deflection coils 24 of the deflection yoke mounted on the neck of the picture tube 18.

The line sweep system 22, only partially shown, may be of known construction. In the partial showing there is a horizontal output tube 25 which drives a horizontal output transformer 26. Transformer 26 includes various taps one of which is connected to the cathode of a damper diode 27, which has an anode connected to B+. Another of the taps of the output transformer is connected through a winding of the horizontal size control 28 to the output terminal 30. The other output terminal 32 is connected to the cathode of the damper diode 27. As will be more fully discussed below, the terminals 30 and 32 are connected to the horizontal deflection windings 34 of the yoke. The end result is that the winding 34 is energized by a sawtooth deflection current at line frequency, which is 15.75 kc.

As is usual in a color television receiver incorporating a tri-beam cathode ray tube with a shadow mask (tube 18), a convergence system 36 is controlled by signals at horizontal and vertical deflection frequency from the sweep systems 22 and 20. The convergence system 36 produces currents of parabolic shape which are applied to the respective convergence inductors 40, 41 and 42. The convergence inductors are individually associated with the three electron beam guns and the convergence effect is applied to the beams along their predeflection paths. Through this convergence system the beams are made to converge at the shadow mask so that each beam coincides at the faceplate despite the fact that the distance of beam travel is considerably farther as the beams impinge the outer extremities of screen 18*a* than it is when the beams are directed at the center of the picture tube screen. Hauge Patent 2,880,360 is further explanatory of the operation of such a convergence system.

In accordance with the teachings of the previously identified Armstrong, O'Fallon Patent 2,880,366 a dynamic blue lateral corrector 50 is disposed adjacent the preconvergence path of the beam associated with the blue raster. In FIG. 2, 51 represents the path of the blue beam, 52 the path of the red beam and 53 the path of the green beam. As represented in FIG. 1, the corrector 50 includes a core and an inductor 50*a* comprising a bifilar winding having primary and secondary.

A high permeability frame member 50*b* (FIG. 2) is suitably retained on the neck of the tube 18 so that the core of the dynamic corrector 50 is closely positioned to the blue beam path 51. It would be adjacent the blue lateral pole piece if the tube has one. Accordingly, the flux from the corrector 50 may extend downwardly in FIG. 2 across the beam path 51 and over to the sides of the frame 50*b* and back to the other end of the core of the corrector through the frame. The primary of the bifilar windings 50*a* is series connected between one side of the horizontal deflection winding 34 and the line sweep system output terminal 12. Therefore, the full sawtooth deflection current of the horizontal sweep system is carried through the primary winding of the corrector.

Figure 3:
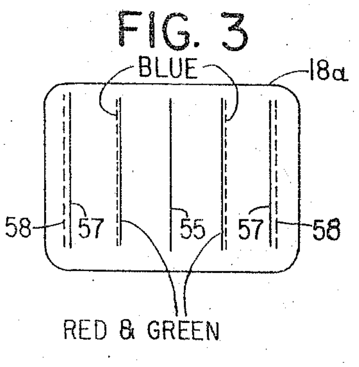
FIG. 3 is a view of the screen of the picture tube in the receiver of FIG. 1.

As shown in FIG. 3, a test pattern on the face 18*a* of the picture tube may result in coincidence of vertical lines from all three electron guns at the center of the screen as represented by line 55. However, the blue raster becomes progressively larger than the yellow (red and green) from the center at a linear rate with respect to displacement. At a given point at the outer edges of the screen the lines 57 produced by the red and green beams may not coincide with the lines 58 produced by the blue beam, indicating the blue raster is somewhat larger than the red and green rasters. This condition can be particularly severe in the case of a color tube having a rectangular face and/or in a tube having a wide deflection angle such as 90°.

The reason that the blue beam may be deflected by a somewhat different amount outwardly from the tube center than the red and green beams are deflected is attributable to the fact that the blue beam enters the yoke field at the center and is symmetrically deflected, whereas the red and green beams enter the field off-center and are unsymmetrically deflected. Since the red and green beams enter opposite sides of the yoke field, distortion of these is opposite to one another. In the unconverged condition the blue beam lands intermediate the red and green beams at the sides of the screen, but when convergence is applied the converged red and green beams experience a progressively lesser deflection than the blue beam, outwardly from the center of the screen of the picture tube. Thus it may be seen that the sawtooth current in the corrector 50 should produce a field which will oppose to a controlled extent the effect of the deflection yoke winding 34, so that the net result of the effect on the blue beam can be coincidence of pattern lines 57 and 58, and coincidence of the beams at all screen positions.

In some cases it may also be found that a static correction, that is a fixed shift of the beam path in one direction, may be required and this is produced by adjustment of the magnet device 60. The blue beam positioning device 60 is rotatable within the frame 50*b* and includes a small magnet, for example, a rod magnet magnetized across its diameter, centrally thereof and adjacent the core of the corrector 50. Thus, a fixed magnetic field may add or subtract from the dynamic magnetic field provided by the corrector 50, depending on the rotational setting of the static corrector device 60.

In addition to the control provided by the static corrector device 60, it is also necessary to vary the dynamic effect of the corrector 50, due to the manufacturing variations in different deflection yokes, variations in the construction of cathode ray tubes, and other variables in the overall system, such as the amount of convergence correction introduced into the system. It should be noted that while it is suggested in FIG. 3 that the blue raster may be oversized compared to the size of the red and green rasters, it is also possible that in any given practical situation the blue raster might be undersized. This would, of course, mean that the field of the dynamic correction must be reversed so that it tends to progressively decrease the deflection of the blue beam from the center. Practical experience has shown that the amount of correction that may be necessary in a color television receiver can be as high as plus or minus one eighth inch, or even plus or minus one-quarter inch.

In order to provide adjustment of the amount of the dynamic correction developed by the magnetic field of the corrector 50, the secondary winding of the bifilar inductor 50*a* is connected to a control inductor 62. The control inductor 62 can be mounted with the frame 50*b* on the tube neck, or alternatively it could be remotely located from the neck of the picture tube. Variable control inductor 62 should be adjustable over a relatively wide range, for example, over an inductance change of 10:1. In this way there can be a sufficiently wide variation in the net flux produced in the core of the corrector 50 to permit the degree of correction previously discussed.

In understanding the effect of the control inductor 62, it should be noted that the secondary winding of the inductor 50*a* and the variable inductor 62 form a control loop in which current will be induced due to the high inductive coupling between the bifilar windings of the inductor 50*a*. As extremes of the effect of this control loop, the cases of open circuit and short circuit thereof can be considered. If the inductor 62 is at a very high impedance value, or if the control loop is opened circuited, then the secondary winding of the inductor 50*a* will have minimal effect on the net field produced by the corrector 50. On the other hand, if the secondary winding of inductor 50*a* is shorted, or if inductor 62 is at a very small impedance value, then the current induced in the control loop will very nearly equal the current of the primary winding and the net field produced by the corrector 50 will be near zero.

FIG. 4 is a graphic representation of the variation in net flux produced by the corrector 50 as the control impedance 62 is varied. It will be noted that the current through the primary of winding 50*a*, represented by line 65, is constant in peak value and, of course, sawtooth in shape. The peak value of the sawtooth current through the secondary of winding 50*a* varies in accordance with the curve 66. As the control impedance 62 increases, the current in the control loop falls off rapidly. As indicated in FIG. 4, the difference in the currents between the primary of inductor 50*a* and the secondary is proportional to the net flux produced by the corrector 50 due to the very close coupling between the primary and secondary. This coupling may be well above 95% in a practical situation so that at minimum impedance for the inductor 62 it is possible to have virtually no net field produced by the corrector 50.

Accordingly, it may be seen that the variable inductor 62 can provide a smooth and continuous control of the amplitude of the net flux from the corrector, which is varying as a sawtooth at the horizontal rate. Furthermore, the control 62 does not carry the actual horizontal deflection current so design problems are minimized and the control 62 may be placed so that it is readily accessible and even conveniently at hand as one looks directly at the screen 18*a* of the picture tube.

In a system of practical construction the inductor 50*a* comprised bifilar windings of 85 microhenries each; the control inductor 62 had a value of 12 microhenries at minimum inductance (slug out) and 120 microhenries at maximum inductance. With these values the inductor 50*a* is of low enough value to have minimum effect on the horizontal deflection current for the winding 34. It should also be noted that while inductor 50*a* has been stated as being bifilar wound, the essential requirement of this inductor is that the primary and secondary windings be very closely coupled, the closeness of the coupling determining how nearly one can reduce the total corrector field to zero. Furthermore, it is not necessary that the primary and secondary windings of the inductor 50*a* have the same inductance, and the described effect is obtainable if they do not since it is the comparison of ampere turns between the two windings which determines the net result.

Figure 5:
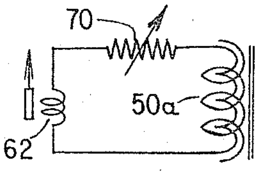
FIG. 5 is a partial schematic diagram showing a modification of the circuit of FIG. 1.

Also as suggested in FIG. 4, with the control impedance 62 at its maximum value (with the slug all the way into the coil, for example) there may still be sufficient current flow in the control loop to prevent a maximum correction by the device 50. Accordingly to further reduce the current in the control loop the circuit of FIG. 5 may be used. In this circuit a variable resistor 70 is series connected with the secondary winding of inductor 50*a* and the control inductor 62. Normally the resistor 70 is kept at zero resistance until it is determined that the maximum impedance of inductor 62 is insufficient for proper correction. Then resistor 70 may be adjusted to further reduce the current in the control loop and permit maximum correction. In a receiver of practical construction as previously described, the resistor 70 had a maximum value of 500 ohms.

In some instances it may be found that an asymmetrical correction is desired for the blue raster, for example, if the left side of the blue raster is approximately in proper registry but the right side is too large. In this situation adjustment of the variable inductor 62 together with adjustment of resistor in the circuit of FIG. 5 can provide a type of asymmetrical correction. This evidences itself most clearly in the region of minimum inductance in the control loop and relatively low resistance such that the L to R ratio is between 1 and .1.

The above described beam correction device is seen to be of relatively simple and inexpensive construction. It provides a continuously adjustable range which may be conveniently controlled by a person setting up the beam registry in a multi-beam color television receiver. The described device finds particular use in a shadow mask type color tube wherein wide deflection angles are encountered and large rectangular screen areas must be swept by the beam.

We claim:

1. In a color television receiver having a cathode ray tube with means for producing electron beam components to be deflected to provide red, green and blue rasters, the combination of, a source of deflection signals, dynamic control means comprising first and second windings inductively coupled and mounted adjacent the pre-deflection path of the beam component associated with the blue raster, said first winding connected to said source of deflection signals, and variable impedance means connected across said second winding to form a control loop therewith, whereby adjustment of said impedance means regulates current in the control loop to establish the amplitude of the net flux produced by said dynamic control means.

2. In a color television receiver having a cathode ray tube with means for producing electron beam components to be converged and deflected to provide red, green and blue rasters, the combination of, a source of deflection signals, dynamic control means comprising first and second windings inductively coupled and mounted adjacent the pre-convergence path of the beam component associated with the blue raster, said first winding connected to said source of deflection signals, and a variable inductor and a variable resistor connected in series circuit with said second winding to form a control loop therewith, whereby adjustment of said inductor and resistor regulates current in the control loop to establish the amplitude of the net magnetic flux produced by said dynamic control means.

3. In a color television receiver having a cathode ray tube with means for producing electron beams to be deflected to provide read, green and blue rasters, the combination of, a source of signals at line deflection frequency, dynamic lateral control means comprising first and second windings inductively coupled and mounted adjacent the pre-deflection path of the beam associated with the blue raster, said first winding connected to said source of signals to carry current at deflection frequency, and variable inductor means connected in series circuit with said second winding to form a control loop therewith, whereby adjustment of said inductor means regulates current in the control loop to establish the amplitude of the net flux produced by said dynamic lateral control means.

4. In a color television receiver having a cathode ray tube with means for producing electron beam components to be converged and deflected to provide red, green and blue rasters, the combination of, a source of sawtooth signals at horizontal deflection frequency, a deflection yoke mounted on the cathode ray tube, dynamic lateral control means comprising first and second windings inductively coupled and mounted adjacent the pre-convergence path of the beam component associated with the blue raster, said first winding connected in series with said yoke to said source of sawtooth signals, and variable inductor means having an inductance range of at least 10 to 1 connected in series circuit with said second winding to form a control loop therewith, whereby adjustment of said inductor means regulates current in the control loop to establish the amplitude of the net magnetic flux produced by said dynamic lateral control means.

5. The combination of claim 4 including a variable resistor connected in series with said inductor means and said second winding.

6. A color television receiver having a cathode ray tube with a rectangular screen and means for producing electron beam components to be converged and deflected through at least 90° to provide red, green and blue rasters, means for converging the beam components adjacent said screen, a source of sawtooth signals at a horizontal deflection frequency, a deflection yoke mounted on said cathode ray tube, dynamic lateral control means comprising first and second bifilar windings inductively coupled and mounted adjacent the pre-convergence path of the beam component associated with the blue raster, said control means further including an adjustable permanent magnet, said first winding connected in series with said yoke to said source of sawtooth signals, and variable inductor means connected in series circuit with said second winding to form a control loop therewith, whereby adjustment of said inductor means regulates current in the control loop to establish the amplitude of the net magnetic flux produced by said dynamic lateral control means.

7. Television apparatus, including in combination, a multi-beam shadow mask, cathode ray tube in which a plurality of electron beams travel pre-deflection paths and in which the beams may be deflected to scan respective rasters, means to converge said beams at the shadow mask, a source of line sweep signals, a deflection yoke mounted on said cathode ray tube, first and second inductively coupled windings positioned adjacent the pre-convergence path of one beam, means interconnecting said source of line signals, said deflection yoke and said first winding so that said first winding develops a magnetic field to deflect said one beam, and a variable impedance connected across said second winding to form a control loop for regulating the net magnetic flux produced by said first and second windings whereby the size of the raster produced by said one beam is regulated with respect to the other rasters by adjustment of said variable impedance.

References Cited by the Examiner

UNITED STATES PATENTS 2,880,366 3/1959 Armstrong ---------- 315—27

DAVID G. REDINBAUGH, *Primary Examiner.*

T. A. GALLAGHER, *Assistant Examiner.*